United States Patent Office 3,636,132
Patented Jan. 18, 1972

3,636,132
BLOCK COPOLYMERS OF TETRAHYDROFURAN
AND 3,3-BIS(CHLOROMETHYL) OXETANE
Takeo Saegusa, Kyoto, and Shuichi Matsumoto, 8–22
Tojiin Kitamachi, Kita-ku, Kyoto, Japan; said Matsumoto assignor to said Saegusa
Filed July 16, 1970, Ser. No. 55,540
Claims priority, application Japan, July 19, 1969,
44/56,762
Int. Cl. C08g 23/04
U.S. Cl. 260—823                           12 Claims

ABSTRACT OF THE DISCLOSURE

Block copolymers of tetrahydrofuran (THF) and 3,3-bis(chloromethyl) oxetane (BCMO) are provided containing an amorphous block of random THF-BCMO copolymer having both of its polymer chain ends linked to crystalline homopolymer blocks selected from poly-THF and poly-BCMO.

---

This invention relates to copolymers of tetrahydrofuran (THF) and 3,3-bis(chloromethyl) oxetane (BCMO). More particularly, it relates to block copolymers of THF and BCMO which contain an amorphous, rubber copolymer block having both ends of its polymer chain linked to crystalline homopolymer blocks of THF or BCMO.

In accordance with this invention, novel block copolymers of THF and BCMO have been discovered. These block copolymers contain an amorphous, linear THF-BCMO copolymer which has both of its polymer chain ends linked to crystalline homopolymer blocks of THF or BCMO. The block copolymers of this invention possess excellent elasticity, comparable to that of rubber, they are not chemically cross-linked, and they can be fluidized, molded and extruded at high temperatures above 140° C. These block copolymers also exhibit high strength and elongation, and generally exhibit the properties of vulcanized rubber at lower temperatures, such as room temperature.

The new copolymers of this invention are produced by the block copolymerization of THF and BCMO to produce, as a new composition of matter, a block copolymer containing at least one amorphous copolymer block, containing at least ten monomeric units, of a random copolymer of THF and BCMO, and at least two homopolymer blocks, each containing at least ten monomeric units, and each being selected from the group consisting of poly-THF and poly-BCMO. At least one, and preferably all, of the amorphous THF-BCMO copolymer blocks have each of their polymer chain ends linked to a crystalline poly-THF or poly-BCMO homopolymer block.

It is believed that the presence of the crystalline end blocks surrounding the amorphous copolymer blocks create a vulcanization effect in the overall block copolymer thereby giving it the high strength and elongation properties of vulcanized rubber.

Both the foregoing general description and the following detailed description are exemplary and explanatory, but are not restrictive of the invention. The invention is further illustrated in the accompanying drawings, in which.

Figure 1:
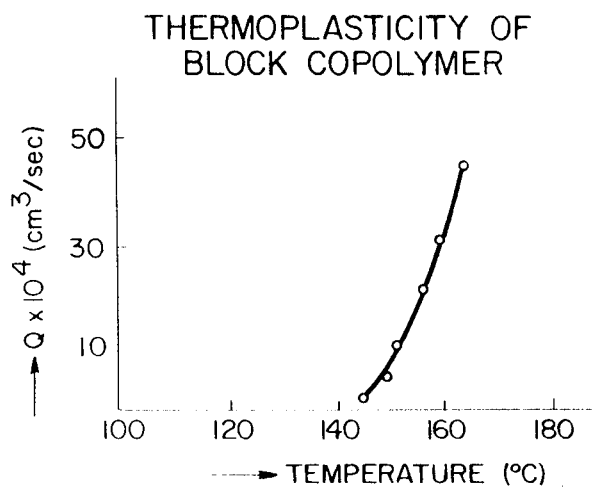
FIG. 1 is a plot of the thermoplasticity properties of the block copolymer of THF and BCMO prepared in accordance with the present invention in Example 1, hereafter.

The block copolymers of this invention include at least one block of a random THF-BCMO copolymer. This copolymer is amorphous in nature, and combines with the crystalline homopolymer blocks to provide the overall characteristics of the new block copolymers of this invention.

The copolymer block is produced by the random copolymerization of THF and BCMO. This copolymerization reaction is a straightforward one, and the overall composition of the random copolymer is generally directly related to the amounts of each of the monomers supplied to the reaction. The copolymer block generally contains about 20 to 90% by weight of THF and 10 to 80% by weight of BCMO, preferably about 60 to 85% by weight of THF and 15 to 40% by weight of BCMO. The monomers are generally allowed to polymerize randomly, and the composition of copolymer block may be substantially uniform throughout its length, or can vary through its linear chain. It is essential that the copolymer block be amorphous and any concentration of THF and BCMO which produces an amorphous copolymer block can be used satisfactorily.

In accordance with the invention, the block copolymers contain at least two crystalline homopolymer blocks which are respectively bound to the polymer chain ends of at least one, and preferably all of the amorphous THF-BCMO copolymer blocks described above. These crystalline blocks are selected from poly-THF and poly-BCMO crystalline homopolymers.

The crystalline poly-THF blocks comprise a successive sequence of $-\text{O}(\text{CH}_2)_4-$ units formed by the ring-opening of THF. Poly-BCMO blocks consist of a successive sequence of $-\text{OCH}_2\text{C}(\text{CH}_2\text{Cl})_2\text{CH}_2-$ units formed by the ring-opening of BCMO.

The crystalline homopolymer blocks of the copolymers of this invention all have a chain length of at least ten (10) monomeric units. The lengths and number of the copolymer and homopolymer blocks present in the composition of this invention can be varied, and the selection and arrangement of the blocks can also be varied, so long as at least one of the amorphous copolymer blocks present in the overall copolymer has both of its polymer chain ends bound to crystalline homopolymer blocks.

The block copolymers of this invention normally have a molecular weight in excess of about 25,000 (weight average), and generally have molecular weights between about 50,000 and 250,000 (weight average), although they may have even higher molecular weights, if desired. As the chain length of the amorphous copolymer center block increases, it is generally also desirable to increase the chain length of the crystalline end blocks, but the size of these various blocks can be varied widely within the above-described limits to adjust and modify the properties of the resulting product, as will be apparent to those skilled in the art from the teachings herein. Each of the blocks should contain at least ten monomer units.

The block copolymers of this invention can contain any desired number of amorphous copolymer blocks and preferably contain a corresponding number of crystalline homopolymer blocks sufficient to link both ends of each of the copolymer blocks to a homopolymer block. In the presently preferred embodiments of the invention, the block copolymers contain either one or two amorphous copolymer blocks, and correspondingly contain either two or three crystalline homopolymer blocks. It is to be understood that the crystalline homopolymer blocks present in any block copolymer may be the same (i.e., all poly-THF or all poly-BCMO) or different (e.g., one poly-THF block and one poly-BCMO block).

Examples of desirable block-copolymers which are provided in accordance with the present invention are listed below. In this listing, THF is used to indicate a poly-THF homopolymer; BCMO is used to indicate a poly-BCMO homopolymer; and the word "copolymer" is used to indicate a random copolymer of THF and BCMO.

THF-Copolymer-BCMO
BCMO-Copolymer-BCMO
THF-Copolymer-THF
THF-Copolymer-BCMO-Copolymer-BCMO
THF-Copolymer-THF-Copolymer-BCMO
THF-Copolymer-THF-Copolymer-THF
BCMO-Copolymer-BCMO-Copolymer-BCMO
THF-Copolymer-BCMO-Copolymer-THF
BCMO-Copolymer-THF-Copolymer-BCMO
Copolymer-BCMO-Copolymer-THF
Copolymer-THF-Copolymer-THF
Copolymer-BCMO-Copolymer-BCMO
Copolymer-THF-Copolymer-BCMO This listing, of course, is not exhaustive, but is illustrative of the structure of the copolymers of this invention. It is to be understood that a variety of polymers may be produced under each of the structural designations shown above by variation of the chain lengths of the various blocks of any designated polymer.

In preparing a "THF-Copolymer-BCMO" block copolymer in accordance with the present invention, THF is first polymerized using a suitable catalyst, more fully described hereafter. This homopolymerization step produces a first crystalline homopolymer end block of THF of a desired chain length. BCMO is then added to the system and a random copolymer is produced between the remaining, unreacted THF and the BCMO. This amorphous copolymer block is formed on the end of the poly-THF crystalline block. At an appropriate time the second stage, random THF-BCMO copolymerization is terminated by removal of the unreacted THF monomer by vacuum distillation, and a third stage polymerization is carried out by homopolymerizing the remaining BCMO monomer. This step forms a second crystalline end block of poly-BCMO on the living end of the THF-BCMO random copolymer.

The block copolymers of this invention can be produced by a variety of methods in which the order of addition of the various monomers, the composition of the THF-BCMO random copolymer block, the time and temperature of each stage of polymerization, and the number of blocks are varied. For example, a BCMO monomer can be first homopolymerized under suitable conditions, followed by random copolymerization of THF and BCMO as a second stage, and then by BCMO homopolymerization as a third stage. The reaction can be terminated then to produce a "BCMO-Copolymer-BCMO" block copolymer, or the third stage polymerization can be followed in succession by another THF-BCMO random copolymerization step, and, for example, BCMO homopolymerization as a fifth stage. In the latter case, a "BCMO-Copolymer-BCMO-Copolymer-BCMO" block copolymer is produced.

Still another example of the production of a block copolymer in accordance with the present invention is a successive series of polymerizations consisting of the random copolymerization of THF and BCMO as a first stage, BCMO homopolymerization as a second stage, random copolymerization of THF and BCMO as a third stage and THF homopolymerization as a fourth stage. This procedure results in the production of a "Copolymer-BCMO-Copolymer-THF" block copolymer.

In the above description, the crystalline end blocks which surround at least one of the random copolymer blocks in the compositions of this invention, have been defined as either poly-THF or poly-BCMO, or as homopolymers of THF or BCMO. It is to be understood, however, that these end blocks may in fact be crystalline copolymers of BCMO and THF containing very minor amounts, for example a few percent by weight, but not more than about 5%, of a second monomer. Thus, for example, a "BCMO homopolymer" may in fact contain about 98% BCMO and about 2% THF without affecting the crystalline character of the "homopolymer" and hence without significantly affecting the overall properties of the block copolymers of this invention. Likewise, "poly-THF" may in some cases tolerate the presence of minor amounts of BCMO, up to about 5%.

Each of the polymerization reactions used to produce the various blocks of the block copolymers of this invention can be carried out in bulk, without solvent, or in an organic solvent that does not impair the polymerization. Suitable solvents include aliphatic and alicyclic hydrocarbons, aromatic hydrocarbons, ethers and halogenated hydrocarbons.

Each of the polymerization reactions is carried out at a temperature in the range of −78° C. to 50° C., with the temperature being adjusted within this range in accordance with the nature of the monomer or monomer mixture being polymerized. If desired, varying temperatures can be employed in each stage of the multistage polymerization used to produce the block copolymers of this invention.

Each of the polymerization reactions is carried out in the presence of a suitable catalyst. The preferred catalysts comprise:

(1) Metal fluorides and semi-metal fluorides; or systems consisting of such fluorides in combination with small ring compounds designated as "promoters"; or (2) Trialkyloxonium salts.

The metal fluoride catalysts used to produce the block copolymers of this invention comprise the fluorides of the metals and semi-metals of Groups III–A, IV–A, IV–B, V–A and VI–B of the Periodic Table. Suitable catalysts thus include $BF_3$, $SbF_5$, $SiF_4$, $SnF_4$, $SnF_2$, $WF_6$, $TiF_3$, $TiF_4$ and $SbF_3$. Some of these fluoride catalysts can be conveniently used as complexes with ethers, for example, a $BF_3$ complex with tetrahydrofuran ($BF_3 \cdot THF$).

The promoters which can be included with the metal fluorides described above in the catalyst systems are alkyene oxides, such as epichlorohydrin, propylene oxide and ethylene oxide; or lactones, such as for example β-propiolactone. The function and behavior of these promoters is described in Die Makromolekulare Chemie, Band 54, page 218 (1962) and Band 105, page 132 (1967), and in Kogykagaku Zasshi (Journal of Japan Chemical Society, Indust. Chem. Sect.) vol. 66, page 474 (1963).

The trialkyloxonium salt catalysts used in the polymerizations of this invention are represented by the general formula

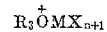

$$R_3 \overset{+}{O} MX_{n+1}$$

where R is an aliphatic or aromatic hydrocarbon group, M is a metal or semi-metal of Group III–A, IV–A, IV–B, V–A or VI–B of the Periodic Table, $n$ is the valence of the metal or semi-metal "M," and X is F or Cl. Triethyloxonium tetrafluoroborate is an example of a suitable trialkyloxonium salt catalyst for use in the polymerization steps of this invention. An alkylene oxide or lactone promoter of the type described above can also be added to the trialkyloxonium salt catalyst, if desired.

The selected catalyst is present in the polymerization reaction in an amount between about 0.05 and 50 mole percent, based on the amount of monomer or monomers present in the polymerization stage.

It will be seen from the foregoing description, that the present invention provides new block copolymers having as their essential structural element an amorphous block of a THF-BCMO copolymer, the ends of which are bound to crystalline blocks selected from poly-THF and poly-BCMO blocks. The block copolymers of this invention possess rubber elasticity. They are not chemically cross-linked and can be fluidized, molded, and extruded into any shape at high temperatures. At lower temperatures, such as room temperature, they exhibit the high strength and elongation properties of the so-called "vulcanized rubbers."

The block copolymers of this invention are useful as rubbery materials and as elastic fibers. They are particularly suited to the making of injection molded rubber products. It is normally difficult to inject mold rubber containing cross-linking agents because cross-linking can occur during the injection molding step. This problem does not arise in injection molding the block copolymers of this invention since they are not subject to such cross-linking. Further, scrap particles of the block copolymers of this invention can be readily reworked, which is not the case in the dealing with conventional rubber materials.

Conventional antioxidants, acid acceptors, stabilizers, fillers and plasticizers can, of course, be added to the block copolymers of this invention.

To illustrate the present invention more specifically, reference is now made to the following examples. It is to be understood that these examples are merely illustrative and are not intended to limit the scope and underlying principles of the invention in any way.

EXAMPLE 1

A mixture of 13.3 grams of THF (15 ml., 185 millimoles), 35 ml. of methylcyclohexane, and 0.14 gram of a $BF_3 \cdot THF$ complex (1 millimole) is cooled to 0° C., and a solution of 0.056 gram of epichlorohydrin (0.6 millimole) in 0.6 ml. of methylcyclohexane is added to initiate homopolymerization of the THF. The first stage THF homopolymerization is carried out at 0° C. for thirteen hours. BCMO, which has been purified and dried by repeated distillation over calcium hydride under reduced nitrogen pressure, is then added to the reaction mixture of the first stage polymerization. A total of 14 grams of BCMO (11 ml., 90 millimoles) is added, and random copolymerization of the remaining THF from the first stage polymerization with the added BCMO is carried out at 0° C. for 1.5 hours.

The reaction mixture of the second stage copolymerization is then cooled to −50° C. and subjected to vacuum distillation at −50° C. for 1.5 hours, and then to continued vacuum distillation at −30° C. for an additional 1.5 hours. During this vacuum distillation THF and methylcyclohexane (the solvent of the first and second stages of the polymerization), which are more volatile than BCMO, are substantially removed from the reaction mixture. The system is retained at 0° C. in vacuo, and the remaining BCMO is homopolymerized. The first and second polymerization steps are carried out under a nitrogen atmosphere.

The final solid product of the third polymerization stage is washed in methanol and dried. The product is purified by reprecipitation in a solvent-precipitant combination of THF and methanol to yield 18.3 grams of a white rubbery material. This product is soluble in THF and insoluble in ethanol and methanol. It has a weight average molecular weight of about 120,000.

The chain links of each of the blocks present in the product are calculated from kinetic studies. These studies show the crystalline poly-THF first block to have a molecular weight of about 17,000, the amorphous copolymer second block to have a molecular weight of about 40,000 and the crystalline poly-BCMO third block to have a molecular weight of about 62,000. The block copolymer product contains 30.3 weight percent of chlorine, which corresponds to 47.6 mole percent (66.1 weight percent) of BCMO.

A sample of the product produced in this example is examined to determine various of its mechanical properties, including thermoplasticity and stress-strain behavior. These properties are illustrated in the accompanying drawings, with the thermoplasticity of the block copolymer being shown in FIG. 1 and the stress-strain curves for the block copolymer of this example being shown in FIGS. 2 and 3. Referring to FIG. 1, the thermoplasticity of the block copolymer is plotted against temperature. Q represents the flow rate of the polymer. A heating rate of 3° per minute is employed in these tests.

The thermoplasticity characteristics shown in FIG. 1 establish that the block copolymer produced in this example is not chemically cross-linked.

Figure 2:
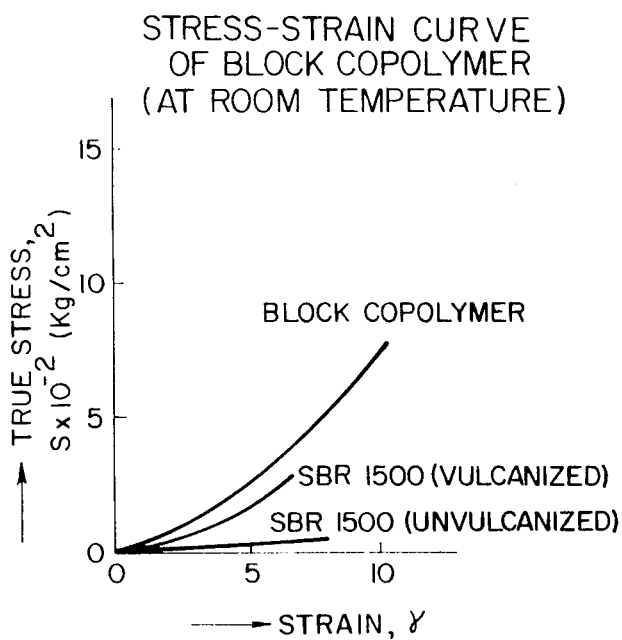
FIG. 2 is a stress-strain diagram of the block copolymer prepared in Example 1, comparing the stress-strain properties of that copolymer with those of vulcanized and unvulcanized SBR rubber.
Figure 3:
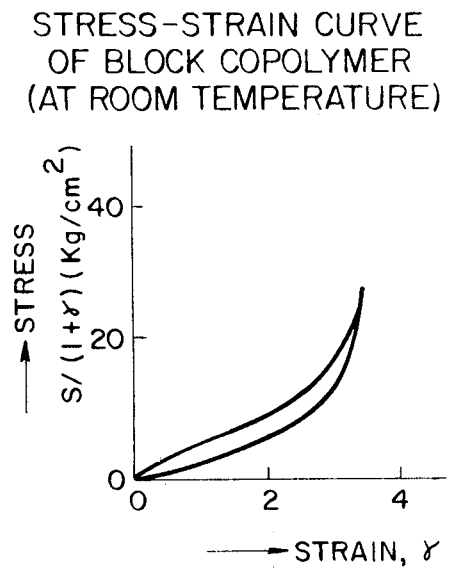
FIG. 3 is a third cycle stretch stress-strain diagram of the copolymer of Example 1.

In FIG. 2 the stress-strain behavior at room temperature of the block copolymer of this invention is compared with vulcanized and unvulcanized SBR rubber. FIG. 3 shows a hysteresis curve for the block copolymer of this invention in the third cycle of stretching at room temperature. The stress-strain properties of the block copolymer of this invention, as shown in FIGS. 2 and 3 indicate that these block copolymers behave like vulcanized rubber. The copolymer prepared in this example shows a large hysteresis loss in the first stretching cycle of the stress-strain tests to which it is subjected, and a yield point is also observed in the first cycle. The hysteresis loss becomes considerably smaller, however, and the yield point disappears as the cycle is repeated. In the third cycle of stretching, shown in FIG. 3, the copolymer behaves very similarly to vulcanized SBR. The relaxation spectrum of the polymer also shows it to behave like a vulcanized rubber. $\gamma$ in FIGS. 2 and 3 is the ratio of the increase in length of the copolymer sample on stretching to the original length of the sample.

Figure 4:
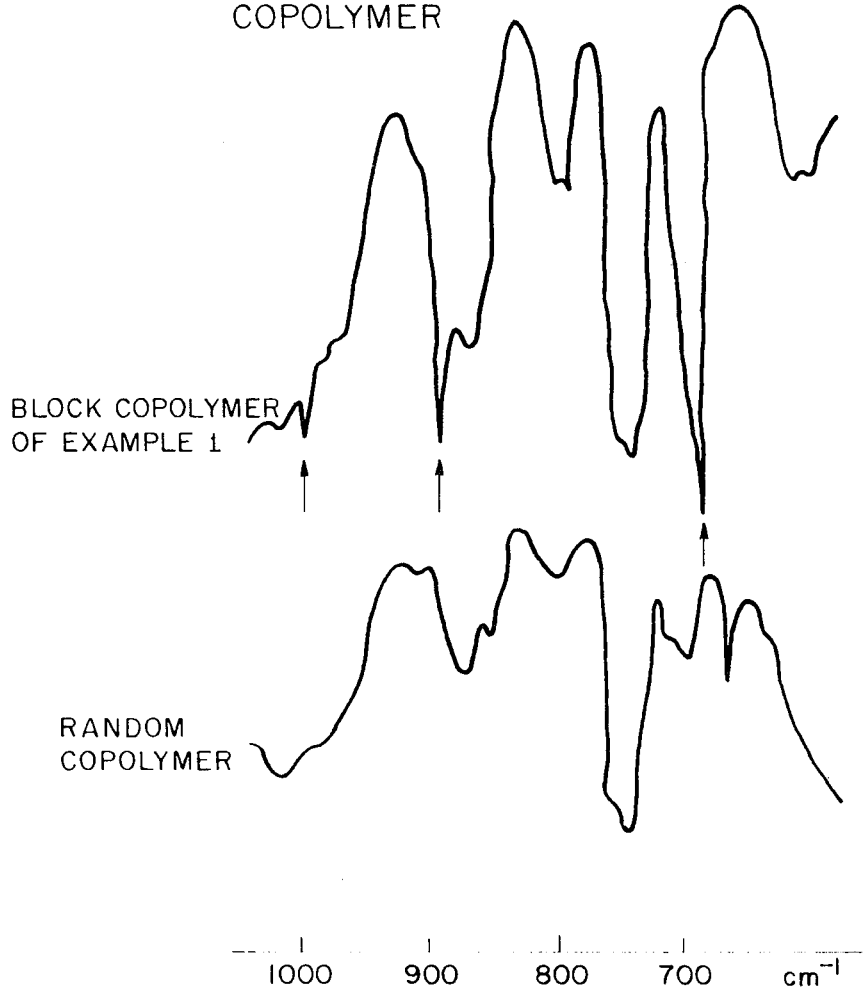
FIG. 4 is an infrared spectrum of the block copolymer of Example 1, comparing it to that of a random copolymer of THF and BCMO, having the same gross composition.

FIG. 4 shows the infrared spectrum of the block copolymer of this example, as compared to the infrared spectrum of a random THF-BCMO copolymer having the same gross composition. It can be seen that the spectrum of the block copolymer of this example clearly possesses crystalline absorption bands due to the presence of the crystalline poly-THF block and the crystalline poly-BCMO block.

EXAMPLE 2

A mixture of 2.7 grams of THF (3 ml., 37 millimoles), 7 ml. of methylcyclohexane, and 0.028 gram of $BF_3 \cdot THF$ complex (0.2 millimole) are charged to a reaction vessel. A solution of 0.011 gram of epichlorohydrin (0.12 millimole) and 0.12 ml. of methylcyclohexane is added to the reaction vessel to initiate THF homopolymerization. This reaction is allowed to continue at 0° C. for thirteen hours, and 2.8 grams of BCMO (2.2 ml., 18 millimoles) are then added to the mixture of the first stage polymerization. Random copolymerization of THF and BCMO is carried out at 0° C. for 1.5 hours. These first and second stage polymerization steps are again carried out under a nitrogen atmosphere.

After the second stage polymerization has been continued for 1.5 hours, the system is cooled to −40° C. and the unreacted THF monomer and the methylcyclohexane solvent are removed by three hours of vacuum distillation at a temperature of −35° to −40° C. The remaining BCMO monomer is then homopolymerized at 0° C. for three hours. The resulting product is treated with a methanol solution in chloroform, and then washed in a large volume of methanol and dried. The purified product is 3.9 grams of a white, rubbery block copolymer. The block copolymer is soluble in tetrahydrofuran and insoluble in methanol. It has a molecular weight of 130,000 and a chlorine content of 33.4 weight percent, which corresponds to 55.6 mole percent (72.9 weight percent) of BCMO. The polymer exhibits properties similar to those of vulcanized rubber.

EXAMPLE 3

A mixture of 2.7 grams THF (3 ml., 37 millimoles), 2.4 ml. of n-hexane, 4.5 ml. of cyclohexane, and 0.028 gram of BF$_3$·THF complex (0.2 millimole) are charged to a reaction vessel. Homopolymerization of the THF is initiated by addition of 0.009 gram of epichlorohydrin (0.1 millimole) at 0° C. The reaction mixture is maintained at 0° C. for fifteen hours, and 2.8 grams of BCMO (2.2 ml., 18 millimoles) is then added. THF-BCMO random copolymerization is carried out at 0° C. for 1.75 hours. The reaction mixture of the second stage copolymerization is cooled to −40° C. and subjected to vacuum distillation at temperatures from −40° C. to −35° C. for 2.5 hours to remove the unreacted THF monomer. The third stage homopolymerization of BCMO is then carried out at 0° C. for three hours. The reaction product is treated with a methanol solution in chloroform and then washed with a large volume of methanol and dried. The resulting product is 3.3 grams of a white, rubbery block copolymer which is soluble in tetrahydrofuran and insoluble in methanol and ethanol. This product has a molecular weight of 110,000 and contains 75.5 percent by weight BCMO. It exhibits properties similar to those of vulcanized rubber.

EXAMPLE 4

The procedure of Example 2 is repeated in this example, except that 0.008 gram of triethyloxonium tetrafluoroborate (0.04 millimole) is substituted for the BF$_3$·THF epichlorohydrin catalyst system of Example 2. The product of this example is 3.5 grams of a rubbery block copolymer substantially similar to that prepared in Example 2.

EXAMPLE 5

The procedure of Example 2 is again repeated in this example through the first two stages of polymerization. In this example, however, the second stage, random copolymerization of THF and BCMO is continued until gas chromatograph examinations of the reaction mixture show an absence of BCMO monomer. An additional 2.9 grams of THF and 10 ml. of methylcyclohexane are then added to the reaction mixture. The latter addition again initiates homopolymerization of THF on the living end of the random copolymer. This homopolymerization is continued at 0° C. for fifteen hours. The reaction product is purified in the manner described in Example 2 and yields a rubbery block copolymer having the structure "THF-Copolymer-THF."

EXAMPLE 6

1.6 grams of BCMO, 15 ml. of methylcyclohexane, and 0.07 gram of BF$_3$·THF complex are charged to a reaction vessel, and 0.009 gram of epichlorohydrin are added and the mixture maintained at −20° C. for 20 hours to produce a BCMO homopolymer. Then 4.3 grams of THF and 4.7 grams of BCMO in 10 ml. methylcyclohexane are added to the reaction mixture from the first stage homopolymerization of BCMO and the second stage THF-BCMO random copolymerization is carried out at 0° C. for three hours. The system is cooled to −40° C. and the unreacted THF monomer is removed together with the methylcyclohexane by vacuum distillation at a temperature of about −40° C. The vacuum distillation is carried out for about three hours. The remaining BCMO is then polymerized at 0° C. for three hours and the resulting product is purified in accordance with the method described in Example 2. The resulting product is a rubbery block copolymer having the structure "BCMO-Copolymer-BCMO."

EXAMPLE 7

The procedure of Example 2 is repeated in this example, except that after the third polymerization step the homopolymerization of BCMO is completed, 2.7 grams of THF, 15 ml. of methylcyclohexane and 2.3 grams of BCMO are added to the reaction mixture and a second block of THF-BCMO random copolymer is formed on the end of the poly-BCMO block by polymerization at 0° C. for 1.5 hours. The system is then cooled to −40° C. and the unreacted THF monomer and the methylcyclohexane solvent are removed by vacuum distillation at that temperature for three hours. The remaining BCMO is then homopolymerized at 0° C. for three hours and the product purified in the manner described in Example 2. The resulting product is a rubbery block copolymer having the structure "THF-Copolymer-BCMO-Copolymer-BCMO." This polymer exhibits properties similar to those of vulcanized rubber.

The invention in its broader aspects is not limited to the specific details shown and described, but departures may be made from such details within the spirit and scope of the accompanying claims without departing from the principles of the invention and without sacrificing its chief advantages.

What is claimed is:

1. As a new composition of matter, a block copolymer of tetrahydrofuran and 3,3-bis(chloromethyl) oxetane, said copolymer having a molecular weight in excess of about 25,000 and comprising:
    (a) at least one amorphous copolymer block, containing at least ten monomeric units of a random copolymer of tetrahydrofuran and 3,3-bis(chloromethyl) oxetane; and
    (b) at least two crystalline homopolymer blocks, each containing at least ten monomeric units and each being selected from the group consisting of polytetrahydrofuran and poly-3,3-bis(chloromethyl) oxetane; at least one of said copolymer blocks having each of its ends linked to one of said homopolymer blocks.

2. The block copolymer of claim 1, wherein said homopolymer blocks include at least one block of polytetrahydrofuran and at least one block of poly-3,3-bis(chloromethyl) oxetane.

3. The block copolymer of claim 1, wherein all of said homopolymer blocks are polytetrahydrofuran.

4. The block copolymer of claim 1, wherein all of said homopolymer blocks are poly-3,3-bis(chloromethyl) oxetane.

5. The block copolymer of claim 1 which includes more than one copolymer block.

6. The block copolymer of claim 5 which includes two copolymer blocks and three homopolymer blocks, one of said homopolymer blocks being linked to an end of both of said copolymer blocks and each of the remaining homopolymer blocks being linked to one remaining end of one of said copolymer blocks.

7. The block copolymer of claim 6, wherein each of said homopolymer blocks is poly-3,3-bis(chloromethyl) oxetane.

8. The block copolymer of claim 6 in which at least one of said homopolymer blocks is polytetrahydrofuran and at least one of said homopolymer blocks is poly-3,3-bis(chloromethyl) oxetane.

9. The block copolymer of claim 1 which contains one of said copolymer blocks and two of said homopolymer blocks.

10. The block copolymer of claim 9, wherein one of said homopolymer blocks is polyterahydrofuran and the other homopolymer block is poly-3,3-bis(chloromethyl) oxetane.

11. The block copolymer of claim 9, wherein both of said homopolymer blocks are polytetrahydrofuran.

12. The block copolymer of claim 9, wherein both of said homopolymer blocks are poly-3,3-bis(chloromethyl) oxetane.

References Cited

Saegusa et al., Copolymerization of 3,3-bis(Chloromethyl)Oxacyclobutane and Tetrahydrofuran, Die Makromolekuare Chemie, vol. 56, pp. 55–64 (1962).

Saegusa et al., Copolymerization of Cyclic Ethers by Alkylaluminum Catalysts, Die Makromolekuare Chemie, vol. 79, pp. 221–29 (1964).

MURRAY TILLMAN, Primary Examiner

J. SEIBERT, Assistant Examiner

U.S. Cl. X.R.

260—2 R, 2 XA, 829